Nov. 12, 1968 W. SCHIEBELER 3,410,957

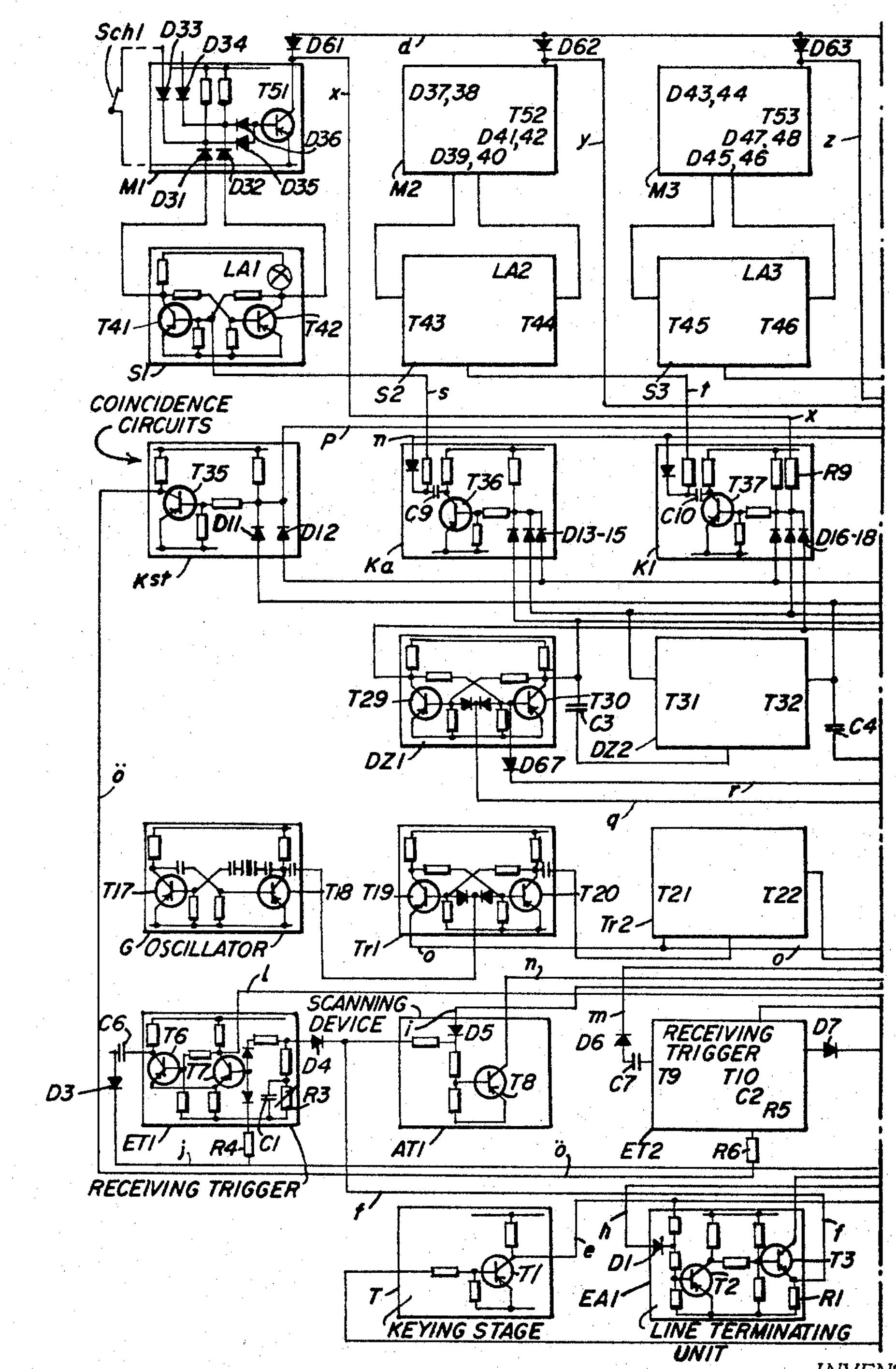
FIG. 1A
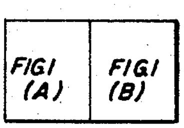
INVENTOR.
WERNER SCHIEBELER

ELECTRONIC SYSTEM FOR SENDING, RECEIVING, AND REGENERATING TELEPRINTER SIGNALS

Filed Nov. 16, 1964 4 Sheets-Sheet 2

INVENTOR
WERNER SCHIEBELER

BY Percy P. Lantzy
ATTORNEY

Transistor blocked = 0
Transistor unblocked = 1

Flip-Flop

| Number decadic | 16 $T_{29}$ | 16 $T_{30}$ | 17 $T_{31}$ | 17 $T_{32}$ | 18 $T_{33}$ | 18 $T_{34}$ | transmitted signal Element | received signal scanning for Signal Pulse |
|---|---|---|---|---|---|---|---|---|
| 0 | 1 | 0 | 1 | 0 | 1 | 0 | is being skipped | |
| 1 | 0 | 1 | 1 | 0 | 1 | 0 | Stop | |
| 2 | 1 | 0 | 0 | 1 | 1 | 0 | Start | 1 |
| 3 | 0 | 1 | 0 | 1 | 1 | 0 | 1 | 2 |
| 4 | 1 | 0 | 1 | 0 | 0 | 1 | 2 | 3 |
| 5 | 0 | 1 | 1 | 0 | 0 | 1 | 3 | 4 |
| 6 | 1 | 0 | 0 | 1 | 0 | 1 | 4 | 5 |
| 7 | 0 | 1 | 0 | 1 | 0 | 1 | 5 | |

Fig. 2

INVENTOR
WERNER SCHIEBELER

BY Percy P. Lantzy
ATTORNEY

INVENTOR
WERNER SCHIEBELER
BY Percy P. Lantzy
ATTORNEY

United States Patent Office 3,410,957
Patented Nov. 12, 1968

3,410,957
ELECTRONIC SYSTEM FOR SENDING, RECEIVING, AND REGENERATING TELEPRINTER SIGNALS

Werner Schiebeler, Eutingen, Baden, Germany, assignor to International Standard Electric Corporation, New York, N.Y., a corporation of Delaware Filed Nov. 16, 1964, Ser. No. 411,419
Claims priority, application Germany, Nov. 20, 1963, St 21,345
4 Claims. (Cl. 178—22)

ABSTRACT OF THE DISCLOSURE

This system permits the recording or ciphering of teleprinter signals whichever may be the direction of information flow. An oscillator whose frequencies can be divided down as determined by the repetition rate of incoming signals furnishes the time base for the regenerated signals. The system further includes a directional blocking device for determining the direction of intelligence flow, a converter for converting between serial and parallel flow, and a storage means for storing the incoming signals.

Figure 1:
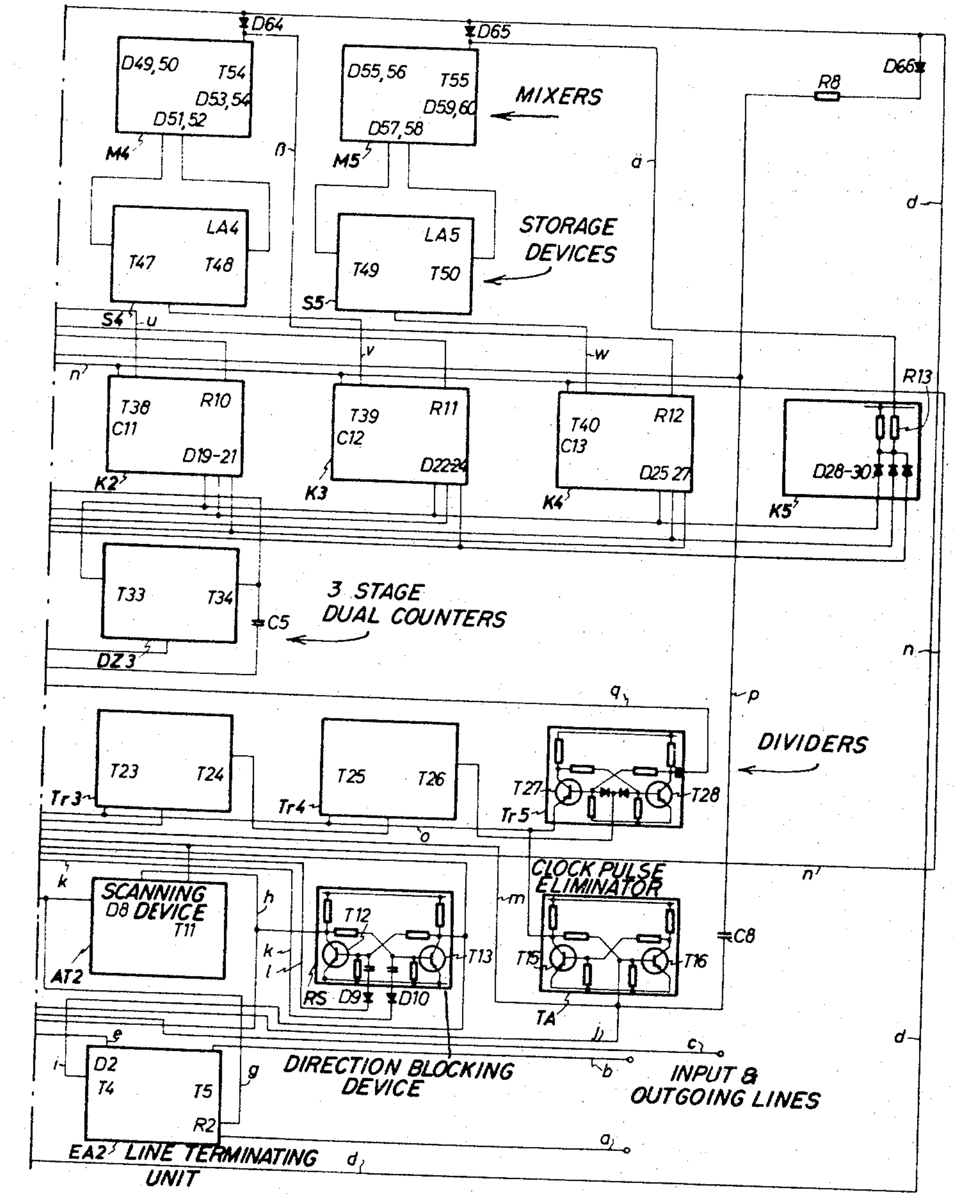

In the field of teleprinter engineering it is often the case that teleprinter signals arriving over a first line, have to be received by one station, and have thereupon to be retransmitted over a second line with a minimum time delay.

One reason for such an intermediate reception is that teleprinter signals which are considerably distorted on account of a long line path, have to be reshaped to the normal unit duration of signal. The apparatus used are known as regenerative repeaters. Another reason for an intermediate reception may be that the code of the teleprinter signals must be changed, for example, instead of one type of telegraph code there is to be employed another code, or only individual signals or characters which have a disturbing effect in international traffic are converted into different types of signals or characters. A third reason for justifying an intermediate reception may be that the teleprinter signals to be transferred are to be garbled as is necessary in connection with the encoding of a message.

With respect to all aforementioned types of practical applications there is in use corresponding apparatus of mechanical construction. These apparatus generally comprise separate systems for sending and receiving which mostly operate independently of one another, in other words, by not being coupled rigidly to one another by a common shaft. In addition thereto, these apparatus can generally only be operated in one direction, viz. teleprinting in alternate directions is practically impossible.

In the following there will now be described an electronic circuit arrangement according to the invention which is suitable for effecting an intermediate reception of teleprinter signals, but which is also of a more simple construction and comprises less deficiencies than the hitherto conventional arrangements.

The inventive type of circuit arrangement does no longer comprise separate systems for receiving and transmitting, which are independent of one another, but substantially consists of a quartz crystal generator, or of another type of oscillator circuit serving as a time base, whose pulse frequency is stepped down to a frequency corresponding to the number of bauds, by the action of subsequently arranged dividers which are released or triggered by the incoming signals. Blocking means determine the direction of the flow of intelligence, a serial-to-parallel converter or a parallel-to-serial converter is stepped on by the frequency divider, and storage flip-flop-circuits are controlled by these devices and the incoming signals. The inventive type of circuit arrangement is characterized by the fact that these circuit devices, as substantial components, not only serve the purpose of receiving, but also the purpose of retransmitting the teleprinter signals. In addition thereto the arrangement can be operated alternatingly in both directions without requiring any switch-over by an operator, and is thus suitable for performing the two-way (semi-duplex) operation. Depending on its equipment, the arrangement can be used as a simple regenerative repeater and for most various types of code conversion.

The invention will now be explained in detail with reference to FIGS. 1–3 of the accompanying drawings. FIGURES 1A and 1B illustrate the circuit in a block diagram. The arrangement is inserted into a teleprinter line circuit shown in FIGURE 1B via the line *b* and *c*. Via these two lines the arrangement is capable of alternately receiving teleprinter signals, and of alternately retransmitting signals over both lines.

The receiving stage of the circuit arrangement, consists of a scanning device AT1 or AT2, the receiving trigger ET1 or ET2, the clock pulse generator G and dividers T*r*1–T*r*5, the serial-to-parallel converter comprising dual counters DZ1–DZ3 and coincidence circuits K*st*, K*a*, K1–K5, and the input storage device S1–S5, in its construction and its mode of operation completely corresponds to the receiving system for electronic teleprinters as disclosed in U.S. Patent No. 3,294,908, issued to W. Schiebeler on Dec. 27, 1961. The novel and most substantial idea of the invention, however, is that major parts of this receiving system, namely the clock pulse generator, the serial-to-parallel converter, and the input storages during their receiving function, are simultaneously also used for retransmitting the received teleprinter signals. In the course of this, however, the serial-to-parallel converter operates as a parallel-to-serial converter, and the input storages S1–S5 are used at the same time as output storages. A substantial function is performed by a so-called direction blocking device which, by its respective position, determines the path direction through the system, and blocks the path for teleprinter signals in the opposite direction during the transmission of a teleprinter signal.

The direction blocking device RS (FIG. 1), consisting of the flip-flop $T_{12}$–$T_{13}$ is switched by the starting element of a teleprinter signal arriving from an arbitrary direction, into the position which is most favourable for this direction. For the time of reception of this signal, the device blocks the opposite direction and remains incapable of being switched during this period of time. Only after the receiving system has assumed the stop position is the direction blocking device released, so that it may be switched by a signal from the opposite direction.

The blocks M1–M5 are designated as mixer stages. These mixer stages are shown in FIGURE 1 as double coincidence OR gates by way of example for denoting the possibility of recoding. The actual embodiment of these so-called mixer stages is dependent upon the kind of recoding which is employed; this, however, does not belong to the subject matter of the present invention. Thus, in particular, the diodes $D_{33}$, $D_{34}$, etc. (FIG. 1) which are contained in the mixer stages, are to be connected to corresponding recoding devices which are not shown in the drawings, for example, to further storage or recognizing circuits (identification circuits or devices).

In the most simple case of the regenerative repeaters, mixer stages M1–M5 (FIG. 1) may either be completely omitted, in which case the diodes $D_{61}$–$D_{65}$ (FIG. 1) are to be directly connected to the storage devices S1–S5 (FIG. 1), or otherwise the diodes corresponding to the diode 33 in the mixer stage M1 (FIG. 1) are to be connected at the mixer stages via switches, to ground (mass). In this case the transistors $T_{51}$–$T_{55}$ operate in the same way as the transistors $T_{41, 43, 45, 47, 49}$. Hence, this is as if the diodes $D_{61-65}$ (FIG. 1) were directly connected to the last mentioned transistors. In the recoding case, however, the circuit condition of the transistors $T_{51-55}$ generally differs from that of the transistors $T_{41, 43, 45, 47, 49}$ (FIG. 1), so that the transmitted signal generally differs from the received teleprinter signal.

Figure 3:
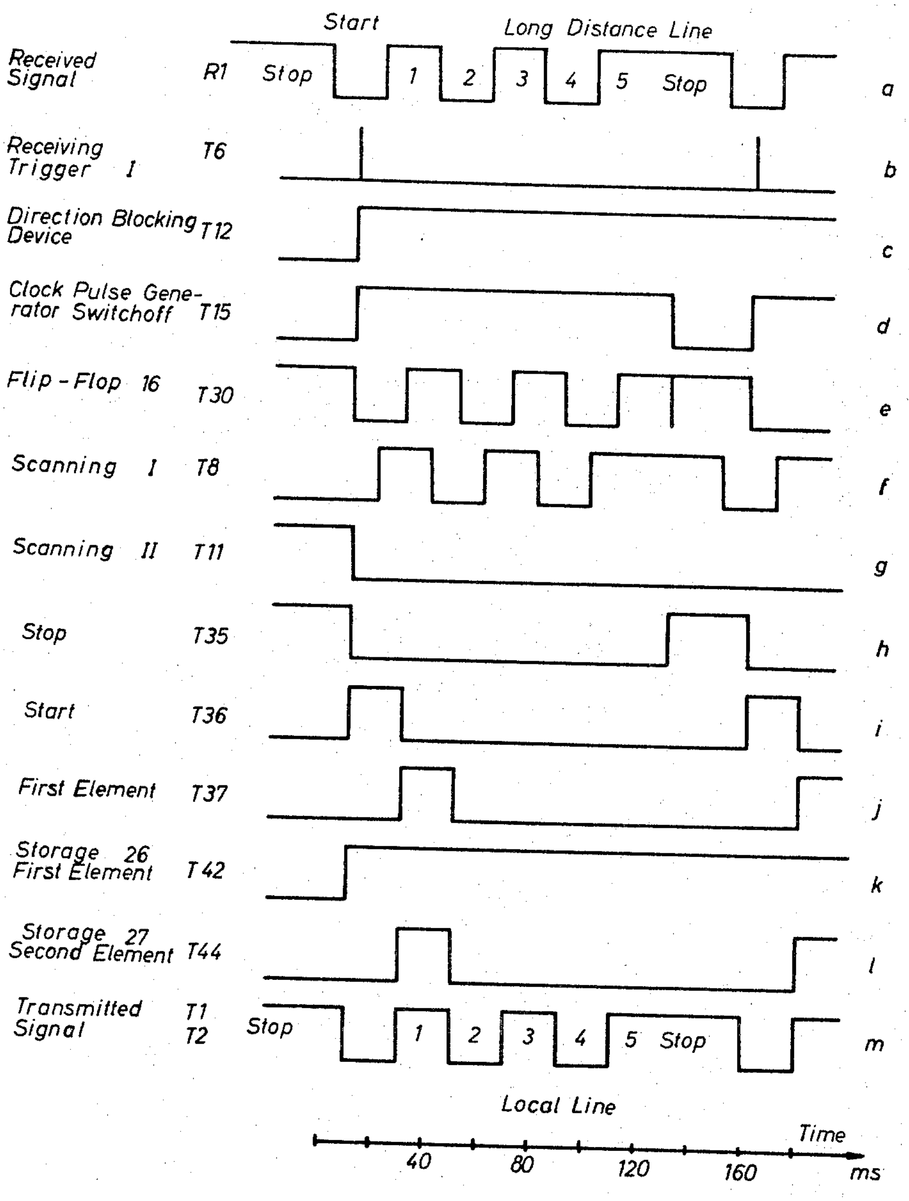

The mode of operation of the circuit arrangement will now be explained in detail with reference to and in connection with FIGS. 1–3, whereby especially the pulse diagram of FIG. 3 represents the different circuit conditions of the most substantial function blocks.

As the starting condition it be assumed that the last teleprinter signal was received via the local line *b*, and that now, after an interval, via the long distance line *c*, a teleprinter signal is being received. Prior to this reception permanent currents (line currents) of 40 ma. are flowing on the lines *b* and *c*, with these currents being maintained by not shown sources of current (120 volts) with corresponding series resistors. The line currents flow through the transistors $T_3$ or $T_5$ and the resistors $R_1$ or $R_2$ (of 100 ohms each), respectively. The voltage drops of —4 volts appearing across these resistors, serve to keep the receiving triggers ET1 or ET2, via the lines *f* or *g* respectively, in that particular circuit condition in which the transistors $T_7$ or $T_{10}$ respectively, are conducting.

Upon reception of a teleprinter signal via the long distance line *c* (see FIG. 3*a*) the line current is first of all interrupted by the start element for 20 ms. (at 50 bauds). The negative voltage at the resistor $R_1$ disappears. The transistor $T_7$ of the receiving trigger ET is still conducting by the discharge current of the capacitor $C_1$. This capacitor $C_1$ is shunted by the series resistors and the base circuit of the transistor $T_7$, and also by the potentiometer $R_3$ (all in ET1). $R_3$ is adjusted so that after the period of 10 ms., the discharge of the capacitor $C_1$ is advanced sufficiently so that the transistor $T_7$ becomes non-conducting, and the transistor $T_6$ becomes conducting (FIG. 3*b*). The negative voltage jump appearing at the collector of the transistor $T_7$ is directed via the line 1 and the diode $D_9$, to the base electrode of the transistor $T_{12}$ of the direction blocking device RS. The transistor $T_{12}$ which was previously assumed to be non-conducting, is now conducting (FIG. 3*c*). By the action of the conducting transistor $T_{12}$, and via the line *h*, the diode $D_1$ (EA1) is now connected to ground (mass). The transistor $T_2$ assigned to the output EA1, is thus retained in the non-conducting condition also when by the keying stage T, a signal for the transmission of a character is directed over the line *e*. The output stage transistor $T_3$ remains conducting for the time duration of the intermediate reception and neither affects the signal reception, nor the retransmission of the signal. Moreover, by the action of the conducting transistor $T_{12}$ of the direction blocking device RS, and via the line *h* and the diode $D_8$ of the scanning device AT2, the transistor $T_{11}$ of the scanning device AT2 is kept in the non-conducting condition (FIG. 3*g*). On account of this the unit AT2 serving the scanning of the pulses of the teleprinter signals on line *b* (via $T_{12}$ and connection G), is disabled, and is thus prevented from scanning the teleprinter signal to be transmitted over the local line *b*.

Due to the reversal on the receiving trigger ET1 a positive voltage jump will appear at the collector electrode of the transistor $T_6$ which, as a positive pulse, is directed via $C_6$, $D_3$ and the line *j*, to the base electrode of the transistor $T_{16}$ of the clock pulse eliminator TA. The flip-flop is triggered, in that $T_{16}$ is made non-conducting, and $T_{15}$ is made conducting (FIG. 3*d*). Via the line ö and the conducting $T_{15}$ all emitters of the transistors $T_{19, 21, 23, 25, 27}$ of the dividers T*r*1 to T*r*5 are applied or connected to ground by the conduction of the transistor $T_{15}$. The clock pulse generator which consists of a freely swinging oscillator stage G and of five binary step-down stages T*r*1–T*r*5, is switched off in the normal condition of the circuit arrangement in that the emitters of respectively the left hand step-down transistors T*r*1–T*r*5, are separated from ground (mass) by the action of the transistor $T_{15}$. Due to the fact that the transistor $T_{15}$ has now become conducting, the step-down stages have become incapable of functioning.

At the next negative pulse produced by the oscillator G all of the step-down flip-flops T*r*1–T*r*5 are triggered from left to right one at a time in turn, and from now on serve to divide the clocking frequency down from 1.6 kc./s. to 50 c./s. as is necessary at a teleprinter signal of 50 bd(bauds). The first reversal of the flip-flops T*r*5 ($T_{27}$–$T_{28}$) produces a negative pulse on the line *q*, which is fed to the flip-flop stage DZ1 of the serial-to-parallel converter. The three-stage dual counter DZ1–DZ3, in the normal condition up to now, has assumed a position which, in the table shown in FIG. 2, is indicated by decimal 1 (=stop). By the action of the first stepping pulse on line *q*, this dual counter DZ1–DZ3 is switched into position 2 (=start) of FIG. 2 (cf. also FIG. 3*e*). To this dual counter DZ1–DZ3 there are connected the seven coincidence circuits K*st*, K*a* and K1–K5 which all serve to take off the seven stable conditions of the dual counter DZ1–DZ3. These coincidence circuits, in combination with the connected transistors $T_{36}$–$T_{40}$, affect the erase and the storing-in of the storage flip-flops S1–S5; in addition thereto they affect the formation of the new teleprinter signal to be transmitted. On account of the fact that the dual counter DZ1–DZ3 has been switched into the position 2 ( see FIG. 2) the coincidence at the diodes $D_{11}$, $D_{12}$ on the block K*st* is eliminated, and has been changed over to the diodes of the block K*a*. In consequence of this, the transistor $T_{35}$ becomes non-conducting, and the transistor $T_{36}$ conducting (FIG. 3, *h, i*). In the same way the negative voltage will appear on line *p* at point K*st*. Current will cease flowing through $R_8$, $D_{66}$, and line *d* into the base of transistor $T_1$ of the keying stage T. The transistor $T_1$ non-conducting, and causes the conduction of transistor $T_4$ of the output stage EA2 via the line *e*. The output stage transistor $T_5$ associated with the output EA2 is now non-conducting (FIG. 3, *m*), interrupts the line current on the local line *b*, and in this way forms the start element of the teleprinter signal to be transmitted. The transistors of the output EA1 remain unaffected, because the diode $D_1$ is connected to ground (mass) via the line *h*, and the conducting transistor $T_{12}$ of the direction blocking device RS.

By the conduction of the transistor $T_{36}$ associated with the coincidence circuit K*a*, a positive erase pulse is applied to the storage flip-flop S1 via the line *s*. In case the flip-flop S1 was in the marked condition it will now be erased in that the transistor $T_{41}$ becomes non-conducting, and the transistor $T_{42}$ becomes conducting, so that the indicating lamp L$a_1$ is lit up (FIG. 3, *k*).

After a period of 20 ms., the dual counter DZ1–DZ3 is stepped on by one step by the action of a stepping pulse applied to line *q*. The negative voltage at the coincidence circuit K*a* will disappear, and the transistor $T_{36}$ becomes non-conducting. Instead of this, a negative voltage is produced at the coincidence circuit K1, and allows conduction of the transistor $T_{37}$ (FIG. 3, *i, j*). 10 ms. earlier the first signal element which was assumed to be a "mark" element, had been received by the input EA1 at point $R_1$. The line *f* is now again applied to negative voltage, and the transistor $T_8$ of the scanning device AT1 becomes conducting, so that the line *n* is applied to ground (mass).

At the beginning of the start element the receiving triggers ET1 and ET2 were disabled in that the transistor $T_{35}$ was non-conducting upon disappearance of the stop-coincidence, and in that the transistors $T_7$ and $T_{10}$ were kept conducting via the line ö and via $R_4$ and $R_6$.

By stopping the conduction of transistor $T_{36}$ of the coincidence circuit K*a* a negative pulse is derived or taken off its collector electrode via $C_9$. This pulse, however, is not applied to the line *s* leading to the storage flip-flop S1, because it is redirected via the line *n* and the unblocked transistor $T_8$ of the scanning device AT1, towards ground (mass). Accordingly, the flip-flop S1 will remain in the erased condition, so that the lamp $La_1$ will continue to burn, and will indicate a first "mark" element as being stored.

By the simultaneous conduction of the transistor $T_{37}$ of the coincidence circuit K*l*, a positive erase pulse was conducted to the storage flip-flop S2 via the line *t*. It be assumed that this flip-flop was previously marked, so that consequently $T_{44}$ is non-conductive and the lamp $La_2$ is not lit. The storage device S2 is now erased by the positive pulse on line *t*, so that the lamp $La_2$ is lit up.

The negative voltage arising at the diodes $D_{16-18}$ of the coincidence circuit Kl, now sends a current to the diode $D_{61}$ across the resistor $R_9$ and over the line *x*. If now, as already discussed hereinbefore, the equivalent circuit M1, for example, by providing and closing a switch $Sch_1$, is affected or influenced in such a way, that $T_{51}$ will have a circuit condition which is in opposition to that of $T_{42}$, then $T_{51}$ is now non-conductive. The current over the line *x*, therefore, is not redirected, but will flow via $D_{61}$ and over line *d*, into the base electrode of transistor $T_1$ of the keying stage T. The transistor $T_1$ becomes conductive. Over the line *e*, the transistor $T_4$ of the output EA2 is non-conducting, and the transistor $T_5$ conducts. The line current may flow on the outgoing line *b*, so that the first "mark" element of the teleprinter signal to be transmitted, is thus formed.

In an analogous manner there is carried out the signal scanning, storing, and the retransmission of the further four received signal elements of the teleprinter signal. In the course of this, the dual counter DZ1–DZ3 of the serial-to-parallel converter is stepped on by one step according to the scheme of FIG. 2, every 20 ms. Consequently, the marking of the coincidence circuits is moved successively from stage K1 via stage K2, etc., to stage K5. The unblocking of the respective associated transistors $T_{37}$ to $T_{40}$ serves to erase the corresponding storage device S2–S5, whereas the negative voltages appearing at the diodes of the coincidence circuits, via the resistors $R_{10}$–$R_{13}$, effect the transmission of the further signal elements. If, in the course of the transmission, the associated transistor $T_{52}$–$T_{55}$ of the mixer M2–M5, is conducting, then this signal element will become a "space" element, and it will become a "mark" element when the associated transistor is not conducting.

The voltage conditions of the various stages may be taken from the time diagram shown in FIG. 3. In this, as in the previous embodiments, it is a prerequisite that the transistors $T_{51}$–$T_{55}$ of the mixer stages M1–M5 each time represent the circuit condition of the lamp and storage transistors $T_{42, 44, 46, 48, 50}$ in an inverted fashion. In this case the transmitted signal is equal to the received signal. However, if the signal is to be modified for a recording or encoding (ciphering) purpose, then the just now firmly assumed relation does not exist, but the transistors $T_{51}$–$T_{55}$ of the mixer stages, via the preceding diode circuits, e.g. equivalent circuits, are differently controlled in accordance with the conditions, than would be the case with the associated storage transistors $$T_{42, 44, 46, 48, 50}$$

As soon as the last one of the five signal elements has been received and retransmitted, the dual counter DZ1–DZ5 is switched into state 0 of the stepping scheme as shown in FIG. 2, by the next successive stepping pulse via the line *q*. In the course of this the transistors $T_{30, 32, 34}$ are nonconducting. By the ceasing of the transistor $T_{34}$ to conduct a negative pulse is applied to the base electrode of the transistor $T_{30}$ associated with the counter flip1flop DZ1 via C, line *r*, and $D_{67}$. Thereupon the transistor $T_{30}$ conductors, the flip-flop DZ1 reverses, and, consequently, the dual counter is switched into state 1 of the stepping scheme shown in FIG. 2. Accordingly, the state 0 is not a stable condition, and is skipped.

The position 1 of the dual counter meets the coincidence requirements of the AND-circuit Kst. A negative voltage is produced at the diodes $D_{11}$ and $D_{12}$, and serves to unblock the transistor $T_{35}$. The negative voltage on line *t* continues to unblock the transistor $T_1$ of the keying stage T with the aid of a current passing through $R_8$, $D_{66}$, and over line *d*. This also causes the transistor $T_5$ of the output EA2 to be conductive, so that a line current will be flowing on the local line *b*. On the other hand, the negative voltage on line *t*, across C8, produces a negative pulse which is directed to the base electrode of the transistors $T_{16}$ of the clock pulse eliminating flip-flop TA. On account of this the flip-flop TA is reversed, and the transistor $T_{16}$ conducts, while transistor $T_{15}$ is blocked and serves to disconnect the transistors $T_{19, 21, 23, 25, 27}$ of the step-down stages T*r*1–T*r*5 from the reference line mass. In this way the clock pulse generator G and T*r*1–T*r*5 are not in operation, and cease to deliver stepping pulses to the line *q*. The whole system is stopped on account of this, and will remain in this quiescent position until a new teleprinter signal arrives over one of the two telegraph lines, beginning with the line current interruption of the start element. By establishing the coincidence condition at the diodes $D_{11}$, $D_{12}$ of the coincidence circuit K*st*, the transistor $T_{35}$ has been made conductive again. The line O now conducts no current, so that the receiving triggers ET1 and ET2 are no longer being kept in the inoperative condition across the resistors $R_4$ and $R_6$. The triggers are now again ready to receive new teleprinter signals arriving over one of the two telegraph lines *b* or *c*.

If the next signal does not again arrive over the long distance line, but over the local line *b*, the direction blocking device RS, which has already been described with respect to the opposite case, will be switched into the state corresponding to the new printing direction, by the receiving trigger ET2. All other operations are then performed analogously to those already described hereinbefore. It is essential that the direction blocking device can only be acted upon in the stop position of the entire system, because the receiving triggers ET1 and ET2 are rendered inoperative in the other positions by the action of the transistor 35 in K*st*.

The phase shift between the incoming and the outgoing teleprinter signals, which was hitherto assumed to amount to half the width of a pulse (FIG. 3), is dependent upon the setting of the potentiometers $R_3$ or $R_5$ in the receiving trigger ET1 or ET2 respectively. In practice, these potentiometers are dimensioned together with the capacitors $C_1$ and $C_2$ in such a way that the phase shift can be adjusted arbitrarily according to requirements between 0 and 20 ms. (=one full width of impulse).

Due to the fact that the receiving and sending systems comprise their own, and also only one single clock pulse generator, the transmitted teleprinter signals have exactly the same pulse width (lengths) and are thus subjected to no kinds of distortions, independently of whether the received signals were little or considerably distorted. Any existing deviations of the duration of the period of the received teleprinted signals from the rated value (e.g. 150 ms.) is compensated by the system described hereinbefore, as well as by all other start-stop systems, by providing a different duration of the inoperative period during the stop condition.

While I have described above the principles of my invention in connection with specific apparatus, it is to be clearly understood that this description is made only by way of example and not as a limitation to the scope of my invention as set forth in the objects thereof and in the accompanying claims.

What I claim is:

1. Electronic teleprinted apparatus adapted for reception of teleprinted code signals from either of two telegraph lines and for retransmitting the signal in the same or modified code to the other line comprising:

an oscillator and a train of frequency dividers said oscillator producing the clock pulses which are divided down by the subsequently arranged frequency dividers;

a separate trigger device being provided for each of the lines for determining the phase, with respect to the incoming code signals, of the clock pulses;

a separate input signal scanning device being provided for each of the lines;

a line terminating unit for each line effective for sensing the line current conditions of that line during reception of signals therefrom and for imposing line current conditions on the line during transmission;

a directional blocking unit, effective upon receipt of a start signal from one of the lines to maintain the line terminating unit of that line in its line current sensing condition and to render the other line terminating unit ineffective for sensing line current conditions, both for the duration of the ensuing code combination;

converter means including dual counters coupled to said dividers, and coincidence circuits coupled to said counters;

a plurality of input storage devices coupled to said coincidence circuits; and means for scanning sequentially, under control of the coincidence circuits, the condition of each storage device and for transmitting to the said other line through its terminating unit a code combination of start and stop signals together with code elements corresponding to the permutable code elements indicated by the condition of the respective storage devices.

2. Apparatus as in claim 1, wherein each line terminating unit includes, shunted across the line terminals, the series combination of the emitter-collector circuit of a transistor and a resistor, and a connection is provided for feeding the voltage across the resistor to the associated said trigger device for starting the clock pulse oscillator and to the associated said input scanning device, and wherein the said transistor of the terminating unit of the line which, for the time being is the outgoing line, is rendered non-conducting except when a marking condition is to be transmitted to the outgoing line.

3. Apparatus as in claim 2 wherein said coincidence circuits are of a plurality of coincidence gating units controlled by the dual counters and operative to transmit to the storage devices in sequence pulses of one polarity and, if there are not shunted out by input line signal conditions, pulses of the opposite polarity, the pulses of one polarity causing the stores each to assume one condition and the pulses of opposite polarity setting the stores to the other condition, the units also effective for starting and stopping the pulse generator and for sending to the outgoing line start and stop signal.

4. Apparatus as in claim 1 including a respective code element mixer unit associated with each storage device and coupled to the dual counters, and another coincidence circuit for transmitting to the outgoing line permutable code elements each of polarity determined by the corresponding storage device and its mixer unit.

References Cited

UNITED STATES PATENTS 2,629,018 2/1953 Wicks -------------- 178—71

FOREIGN PATENTS 202,068 5/1956 Australia.

THOMAS A. ROBINSON, *Primary Examiner.*